Feb. 19, 1952     J. R. GOMERSALL ET AL     2,585,928
ELECTRIC IRON AND METHOD OF MAKING OF SAME
Filed April 2, 1945     4 Sheets-Sheet 1
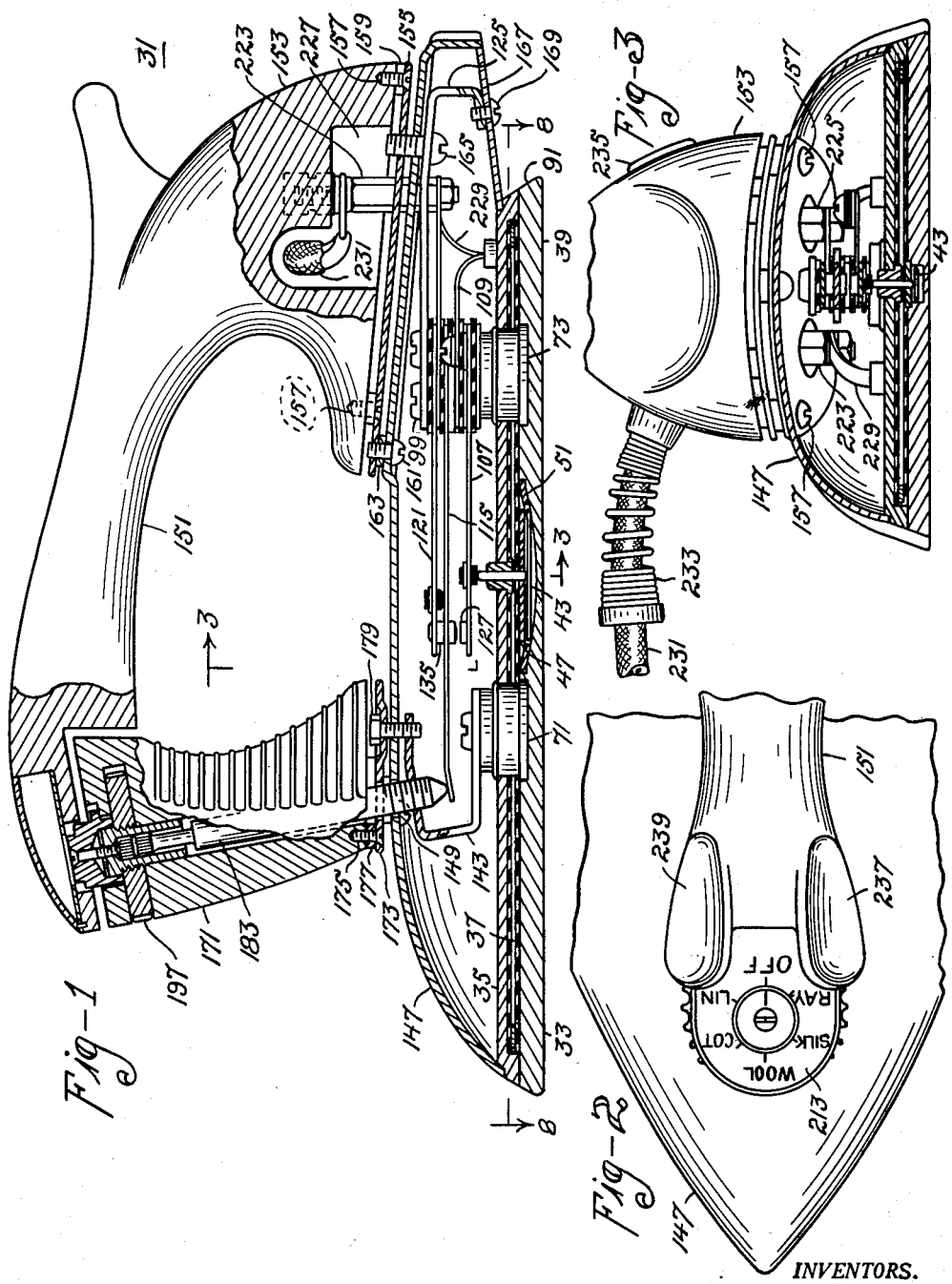
INVENTORS.
MURRAY IRELAND
BY JOHN R. GOMERSALL
ATTY

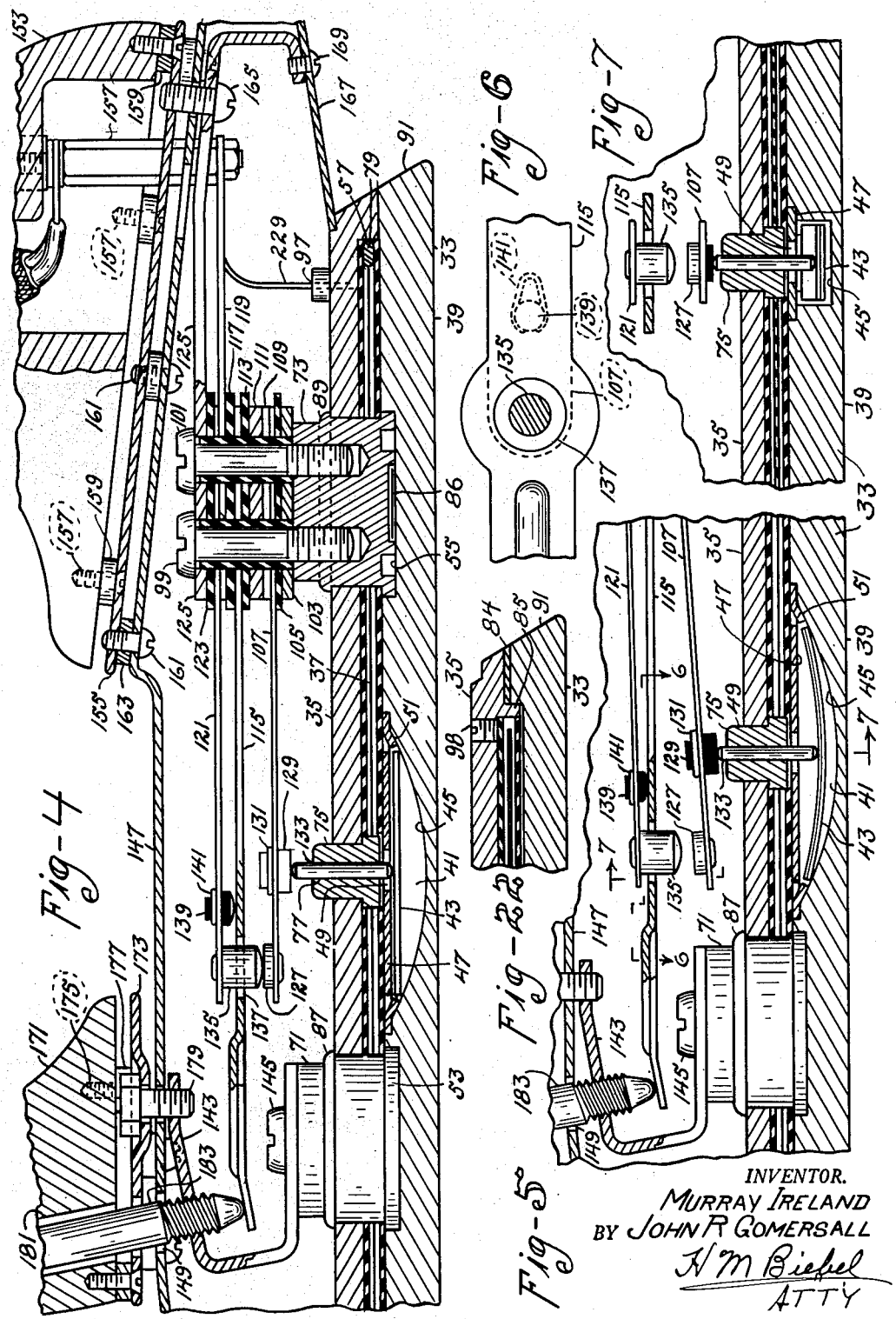

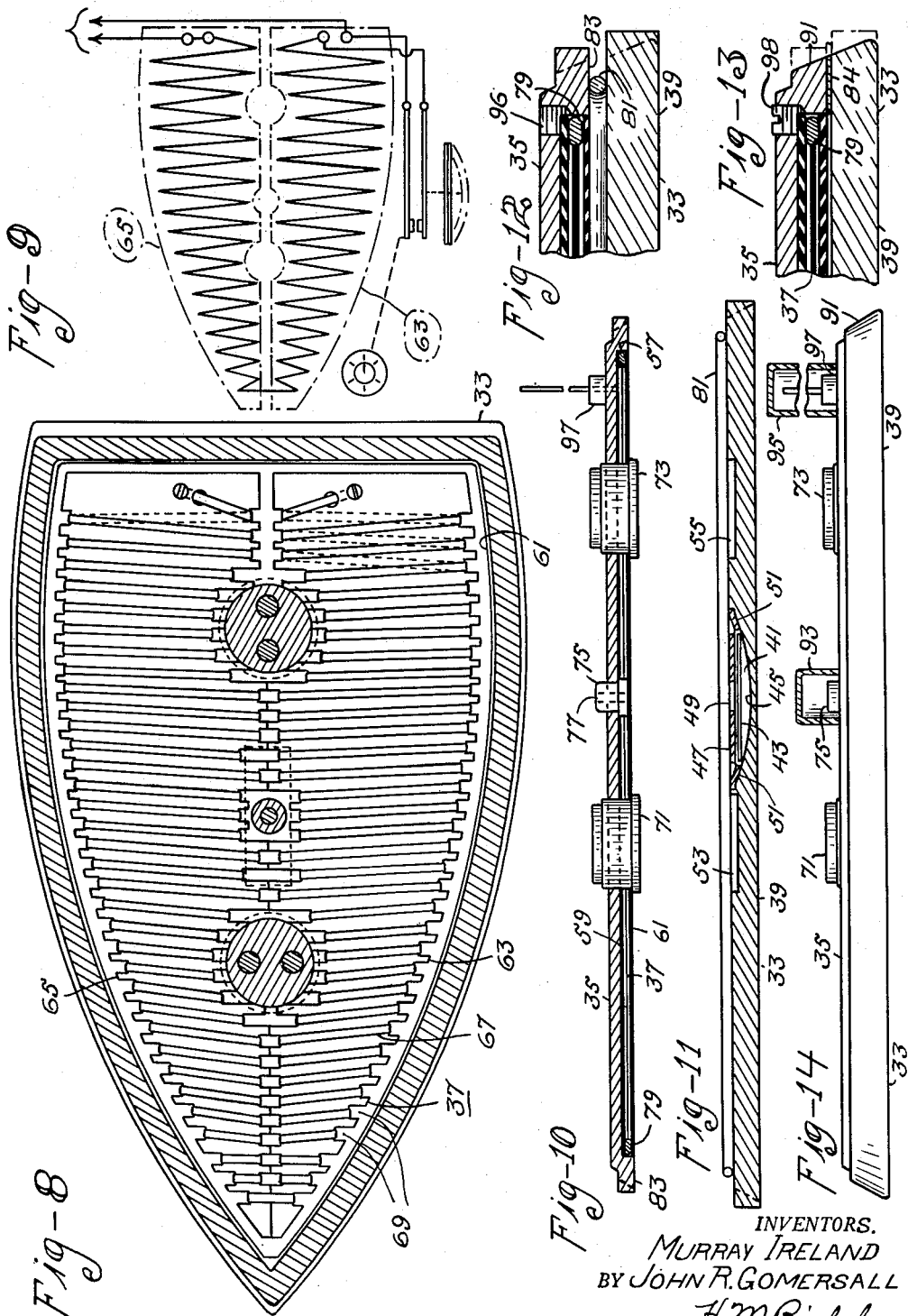

Feb. 19, 1952 J. R. GOMERSALL ET AL 2,585,928
ELECTRIC IRON AND METHOD OF MAKING OF SAME
Filed April 2, 1945 4 Sheets-Sheet 4
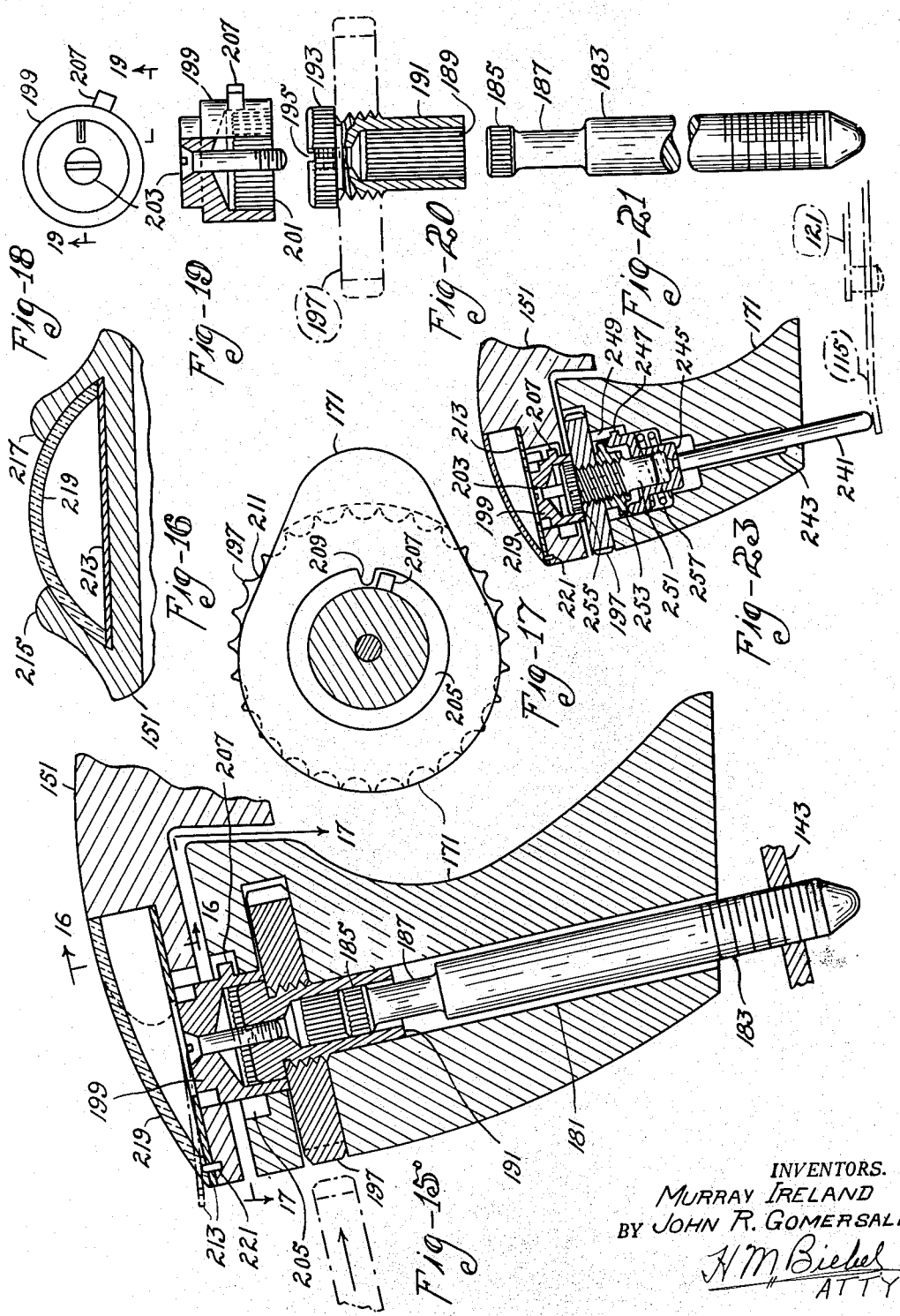
INVENTORS.
MURRAY IRELAND
BY JOHN R. GOMERSALL
H. M. Bieber
ATTY

Patented Feb. 19, 1952

2,585,928

UNITED STATES PATENT OFFICE

2,585,928

ELECTRIC IRON AND METHOD OF MAKING OF SAME

John R. Gomersall, Elgin, and Murray Ireland, near Elgin, Ill., assignors to McGraw Electric Company, Elgin, Ill., a corporation of Delaware Application April 2, 1945, Serial No. 586,099

15 Claims. (Cl. 219—25)

Our invention relates to sadirons and particularly to electrically heated sadirons.

An object of the invention is to provide an electrically heated iron controlled by a thermally responsive switch and constructed so that the switch operates in close relationship with the temperature of the ironing surface of the sole plate and so that the temperature of the thermal element of the switch varies in close time relationship with temperature variations of the ironing surface.

Another object of the invention is to provide a light-weight electrically heated iron embodying a thin sole plate which responds quite rapidly to heating and cooling influences and to provide for efficient regulation of the heating element by a thermally responsive switch suitable to such thermal characteristics of the sole plate.

Another object of the invention is to provide a light-weight electrically heated iron having low heat storage capacity and high thermal conductivity and to provide correct automatically controlled heating for such iron.

Another object of our invention is to provide a novel method for assembling a sole plate, a top plate, and an electric heating element to constitute the heated body of an iron.

Still another object of our invention is to provide a relatively light-weight iron that shall heat up quickly and that shall be so assembled that the ironing surface shall not warp after repeated periods of heating and cooling during use.

Other objects of our invention will either be apparent from a description of one form of device embodying our invention or will be set forth in the course of such description and particularly in the appended claims.

In the drawings,

Figure 1 is a longitudinal, sectional view through the center of an iron embodying our invention, the contacts being shown in the positions as when the control indicator is in the position shown in Fig. 2 and the iron is cold, Fig. 2 is a top plan view of the indicator in the handle, Fig. 3 is a lateral, sectional view taken on the line 3—3 of Fig. 1, Fig. 4 is a longitudinal, sectional view of the control switch on an enlarged scale, the contacts being shown in the positions they will occupy when the indicator control of Fig. 2 is moved clockwise and the iron is therefore heating up, Fig. 5 is a fragmentary view similar to Fig. 4 except that the contacts are shown in the positions they will occupy when the iron has been heated and the heater has been deenergized, Fig. 6 is a fragmentary horizontal sectional view taken on the line 6—6 of Fig. 5, Fig. 7 is a vertical, lateral, sectional view taken on the line 7—7 of Fig. 5, Fig. 8 is a horizontal, sectional view taken on the line 8—8 of Fig. 7, Fig. 9 is a diagram of electrical connections of the heating element, Fig. 10 is a longitudinal, vertical, sectional view of a top plate showing a heating unit and assembly plugs mounted in proper operative position therein, Fig. 11 is a longitudinal, vertical, sectional view of a sole plate with a thermostatic bar and a brazing member in position for brazing the top and sole plates together, Fig. 12 is a fragmentary, vertical, sectional view of the top and the sole plates in position for welding shown on an enlarged scale, Fig. 13 is substantially the same as Fig. 12 except the two plates have been brazed to each other.

Fig. 14 is a view in side elevation of a finished body portion having thereon covers for protection of openings in the upper surface of the heated body during plating, Fig. 15 is an enlarged vertical, sectional view of the handle showing the control elements, Fig. 16 a fragmentary, vertical, sectional view taken on the line 16—16 of Fig. 15, Fig. 17 is a sectional view taken on the line 17—17 of Fig. 15, Fig. 18 is a top plan view of the device shown in Fig. 19, Figs. 19, 20 and 21 are detailed views of the control elements in an exploded view, Fig. 22 is a fragmentary view in section of another form of top and sole plate, and Fig. 23 is a view, on a reduced scale, of another control means.

Referring first of all to Fig. 1 of the drawings, we have there shown an electric iron designated generally by numeral 31, which iron comprises a relatively thin metal sole plate 33, a relatively thin top plate 35, and an electric heating element 37, these three members constituting the heated body portion of an electric iron. The sole plate is composed of metal of high thermal conductivity. The top plate should also be of a metal of high-heat conductivity since, as will hereinafter appear, the same is secured at its margins in heat-conducting relation with the sole plate for the transfer of heat thereto should occasion require. Because of their thinness and to insure against warping the top plate and sole plate should have the same or substantially the same coefficient of expansion. We prefer to make them of the same metal.

Referring now to Figs. 10 to 14 inclusive, we have shown in Fig. 11 a relatively thin metal sole plate 33 which may be punched or otherwise shaped from a relatively thin bright-surface sheet of metal, such as brass. We do not desire, however, to be limited to brass since other metals may be used in place of brass although we prefer metals or alloys of high thermal conductivity. It may be here mentioned that we prefer to use high yellow brass and that the thickness of sole plate 33 is on the order of ⅛″, although we do not desire to be limited to such a kind of brass nor to the thickness given. The sole plate 33 has an ironing surface 39 on its underside and has a recess 41 at substantially mid point thereof and extending longitudinally of the sole plate at substantially the mid-portion thereof. A bimetal bar 43 is adapted to be positioned loosely in said recess 41 with its ends in contact with the sole plate and to have its mid portion flex downwardly towards the arcuate lower surface 45 of said recess when heated. We provide a thin metal cover 47 for the recess 41, which cover 47 is provided with a center opening 49 as well as with two depending bent-out portions 51 adjacent each end thereof in order to hold the bimetal bar 43 in substantially its proper operative position in spite of changes in the position of the assembled iron. The cover 47 is adapted to fit tightly in the upper part of recess 41 so that it will not be easily and quickly displaced from its normal operative position. We provide a pair of spaced recesses 53 and 55 in the upper surface of the sole plate, which are preferably made of substantially circular shape and are aligned on the longitudinal center line of the sole plate 33.

The top or clamping plate 35 is formed also from a relatively thin metal plate and has a recess 57 in its lower surface for receiving the electric heating element 37. We prefer to make the top plate of high yellow brass and to make its total thickness on the order of 3/32″, although we do not desire to be limited to the thickness mentioned. The heating element 37 comprises a top or upper sheet of mica 59, a lower sheet of mica 61, both of these sheets being generally of a shape to conform to the outline of the sole plate and of the top plate within the recess 57. The heating element comprises further a pair of mica sheets 63 and 65, the outer edges of which conform to the curvature of the sole plate 33 and of the top plate 35 while the inner substantially straight edges extend longitudinally of the iron with a small gap therebetween. A resistor strip 67 is wound laterally around the respective strips 63 and 65 and is held in place by any means now well known in the art such as by a plurality of recesses 69 in both edges of each strip. The heating element overlies substantially the entire surface of the sole plate to insure uniform heating of all areas thereof. Because of this and the high thermal conductivity of the sole plate and top plate and also because of the efficient heat exchange relation provided by the assembly suitable heating can be obtained under all conditions. By reference to Fig. 8 of the drawings it will be noted that certain portions of the resistor strip 67 extend over the bimetal bar 43 so that such bar is subject to heat from these portions.

We provide a pair of assembly plugs 71 and 73 which have a tight fit over the body portion thereof in the top plate 35, while the lower end portion has a slightly larger diameter than the said body portion, the lower end portion of plug 71 being adapted to fit into recess 53. Substantially the same comments apply to the plug 73, the lower enlarged-diameter end portion of which is adapted to fit into recess 55 in sole plate 33. The plates 59, 63, 65, and 61, of mica are provided with openings through which the plugs 71 and 73 may extend and as hereinbefore noted, the body portion of the plugs 71 and 73 has a tight fit in openings in the top plate 35 so that it is easily possible, during assembly of the body portion of the iron, to hold the heating element in its proper operative position in the recess 57 in the top plate.

We provide further a bushing 75 which is of electric-insulating high-temperature-resisting material and has an opening 77 extending vertically and centrally therethrough. The bushing 75 is adapted to register with opening 49 for a purpose which will hereinafter appear.

The first step in assembling the body portion is to position the heating element 37 in recess 57 in top plate 35, a cord 79 of asbestos, or other high-temperature-resisting electric-insulating material, being positioned just within the vertical shoulder of the recess 57. A wire 81, of brazing material, is shaped to follow substantially the outline of the shoulder portion 83 of the top plate 35 and is then placed upon the upper surface of sole plate 33, after which the top plate 35, the two assembly plugs 71 and 73 as well as the bushing 75 therein being then positioned in proper relative operative position on the sole plate and may then be clamped together to maintain the proper operative positions of the parts.

The assembled parts of the body portion are then placed upon or in a heating means by which the temperature is raised to a value on the order of 1300° F. or to a temperature which is just below that at which the material of the top plate and the sole plate softens or to at least a temperature to cause melting of the brazing material. The brazing material is an alloy comprising silver and copper which starts to melt at a temperature on the order of 1175° F. As soon as the top and the sole plates have reached the desired temperature an increased pressure is applied to the assembly and the total pressure is on the order of 1,000 pounds, the pressure being applied as uniformly as is possible so that the wire or member 81 having been melted and the top plate being at least slightly thinned out or giving, whereby the heating element is tightly clamped between the top plate and the sole plate.

Since the melting point of the brazing material is lower than the temperature to which the assembly is heated, it will melt and spread out between the top plate and the sole plate, as shown by 84 in Fig. 13. Inward flow of the molten brazing material toward the edges of the electric heating element will be prevented by the asbestos string 79 or by a depending shoulder 85 on the top plate 35, as is shown in Fig. 22. When the high pressure is applied, the outer flat margin of the top plate contacts the outer flat margin of the sole plate with the molten brazing material between them. The distance between the edges may vary from .000″ to .005″ because of mechanical imperfections and this space is filled by the brazing material.

After the edges of the top plate and of the sole plate have contacted, the softened metal of the top plate gives under the high pressure applied until stopped by the tightly compressed heating element, and this giving or forming may amount to .000″ to .015″. The heat is then shut off, which allows the brazing material to solidify while the body portion is under the relatively high pressure and the cooling is continued while still under the high pressure until a temperature on the order of 600° F. to 800° F. is reached.

In order to hold the assembly plugs 71 and 73 in fixed engagement with the sole plate in the respective recesses 53 and 55, brazing material 86 (Fig. 4) is provided in the recesses, which brazing material will also be melted and thereby cause close adherence of the plugs 71 and 73 in recesses 53 and 55. The body portion of the two individual assembly plugs 71 and 73 are then swaged over against the upper surface of top plate 35 as shown at 87 and 89 in Fig. 4 of the drawings. This swaging is done under relatively heavy pressure with the result that the middle portion of the planar heating element 37 is tightly compressed between the sole plate 33 and the top plate 35. This tight compression has two results, the first one being that the distance between the outside surfaces of mica sheets 59 and 61 and the adjacent surfaces of top plate 35 and of sole plate 33 will be a minimum so that the difference of temperature between these adjacent surfaces will be and remain a minimum. The second result is that there will be no warping of the ironing surface of the sole plate as a result of numerous cycles of heating-up and cooling-down during many years of operative use.

The assembly is then permitted to cool down to ordinary room temperature, after which the assembled body portion has its outer periphery subjected to a machining operation to obtain a beveled edge 91 around its outer periphery.

Immediately after removing the relatively high pressure and while the top plate is still at a temperature above, say 500° F., a plurality of removable cover members 93 and 95 are soldered against the upper surface of top plate 35 in order to seal the openings 77 and 97 through which latter openings extend the electric-insulating bushings for the leads from the heating element so that the beveled surface 91 as well as the ironing surface of the sole plate 33 may be plated. If found necessary or desirable an opening 96 may be provided in top plate 35, communicating with the recess 57 so as to vent the recess and permit escape of any vapors distilled from the mica sheets during the brazing operation. A short headless screw plug 98 may be inserted into opening 96 before plating the body portion. After plating, the cover members 93 and 95 are removed. It may be here pointed out that the brazing operation on the top plate and the sole plate calls for great care to prevent a line of separation between the two plates from showing after machining the peripheral surface, since this line of separation will not disappear under the plating.

Assembly plug 73 is then drilled with two holes for receiving a pair of clamping screws 99 and 101 which are adapted to clamp tightly against the upper surface of plug 73, a thermally-actuable control switch for the heating element 37. A metal plate 103 engages the upper surface of plug 73, then a sheet of mica 105, then a lower contact bar 107, then a terminal plate 109, then a second relatively heavy metal plate 111, then another sheet 113 of electric-insulating material, such as mica, then a spring arm 115, then another sheet 117 of electric-insulating material such as mica, then a terminal plate 119, then an upper contact arm 121 and then a sheet 123 of electric-insulating material, such as mica. We provide further a casing supporting member 125 which is of substantially U-shape and all of these parts are clamped tightly against the upper surface of plug 73 between clamping screws 99 and 101.

The contact bar 107 extends substantially longitudinally of the iron and has a contact member 127 on its upper surface adjacent its outer end. It also has a bushing 129 which has its major portion extending below bar 107 and which is held in proper operative position on bar 107 by a clamping member 131 of substantially U-shape. The lower surface of member 129, which is preferably made of electric-insulating material, is adapted to be engaged by the upper end of an actuating pin 133 which fits in opening 77 in bushing 75, the lower end of pin 133 resting upon the bimetal bar 43. The bimetal bar 43 is adapted to flex downwardly, particularly at its mid portion, upon increase of temperature and bar 107 is therefore biased in a counter-clockwise direction, so as to follow up the bimetal bar 43.

Contact bar 121 has a contact member 135 thereon and extending therebelow, adjacent its outer end which contact is adapted to extend through an opening 137 in spring arm 115 to engage contact 127, the contact bar 121 being biased in a counter-clockwise direction. Contact arm 121 has a bushing 139 thereon, extending therebelow and adjacent to contact 135, which bushing 139 is held by a spring member 141 similar to member 131.

A second casing support of U-shape 143 has one of its legs secured against the upper surface of plug 71 as by a machine screw 145.

The iron is provided further with a cover or casing 147, the lower edge of which is adapted to rest upon the outer peripheral surface of the top plate 35 and is provided with a forward opening 149 for a purpose which will hereinafter appear. A handle 151 having an integral handle support 153 adjacent to its rear end portion is provided and is preferably made of a heat and electric-insulating material. The rear handle support 153 is adapted to be secured to an intermediate spacing plate 155 by a plurality of short machine screws 157 and spacers 159. The plate 155 is adapted to be operatively secured against a cooperating surface of the casing 147 by a plurality of short machine screws 161, there being spacing members 163 located therebetween.

The rear end portion of the handle and of the casing are held in proper operative position relatively to the heated body by a single screw 165 extending through support member 125 of substantially U-shape, through casing 147 and into plate 155. A rear closure plate 167 is provided and is held by a single short machine screw 169, which has screw-threaded engagement with rear support 125.

A hollow front member or column 171 is provided, made of the same material as handle 151, the upper end of which is entirely out of engagement with the front end of the handle 151. The lower surface of hollow column 171 has secured thereagainst a spacing plate 173 as by a plurality of short machine screws 175 with spacers 177 therebetween. The spacing plate 173 is secured against the front support 143 of substantially U-shape by a single short machine screw 179, which machine screw has screw-threaded engagement with the upper end portion of the support 143. After assembly of the iron, in case it is desired to remove the handle and casing, all that is necessary will be to remove screw 169 as well as the rear closure plate 167, after which removal of screws 165 and 179 permits of removal of the handle and casing, it being understood, of course, that the connecting leads from the heating element to terminals in the rear handle support have also been first removed.

The hollow front column 171 has an opening 181 extending substantially longitudinally therethrough, which opening is adapted to receive means manually-adjustable for changing the position of the spring bar 115 of the control switch for the electric heating element 37 of the iron. Opening 181 has positioned therein a control shaft 183, the lower end portion of which is provided with screw threads for engaging with support 143 so that upon rotary movement of control shaft 183, the lower end portion normally engaging the outer end portion of spring bar 115, will be moved either upwardly or downwardly. It is to be noted that spring bar 115 is biased into a clockwise direction while contact arms 107 and 121 are biased in a counter-clockwise direction. The upper end portion of control shaft 183 is provided with a short serrated or fluted end portion 185 as well as with an intermediate relatively short portion 187 of reduced diameter. The upper end portion 185 is adapted to fit into an opening 189 in a control wheel hub 191. The control wheel hub has an upper enlarged end portion 193 (Fig. 20) which has a screw driver slot 195 therein for a purpose which will hereinafter appear. The opening 189 is also fluted longitudinally to permit of slidably interfitting engagement with the fluted head 185.

We provide further a control wheel 197 having an inner screw threaded opening therein, which control wheel is adapted to have screwed thereinto the control wheel hub 191. We provide further a control wheel stop member 199 which is provided at its lower end with an opening 201, the inner surface of which is fluted to receive the externally fluted portion 193 of the control wheel hub. The control wheel stop member 199 is adapted to fit over the upper end portion 193 of the control wheel hub and to be held in selectively adjusted position peripherally thereof by a machine screw 203.

The upper end portion of the hollow front column 171 is provided with a recess 205 therein for receiving the control wheel stop 199. A projection 207 is provided intermediate the ends of the control wheel stop 199 and a cooperating projection 209 is provided in recess 205 in a predetermined position to prevent excess peripheral adjusting movements by the operator turning the control wheel.

When assembling the iron, the control shaft 183 may be screwed into the support 143 after which the front column 171 is placed in proper operative position on the casing. After this, the control wheel 197 is pushed into the recess provided for it in the column 171 and then the control wheel hub 191 is screwed into the control wheel. The operator then adjusts the position of the control wheel by turning the same until contact 135 just engages contact 127 when the iron is cold. Then he places the control wheel stop 199 with the projection 207 positioned relatively to the projection 209 substantially as shown in Fig. 17 of the drawings, after which he screws in screw 203 tightly.

It is to be noted that the outer periphery of the control wheel 197 may be provided with flutes 211 for convenience of the operator and that these flutes extend outwardly beyond the periphery of member 171 for engagement by the operator's thumb and finger of the hand holding the iron. (Figs. 2 and 17.)

A dial 213 is positioned in a recess at the front end of the handle 151. This recess is further provided with covering extensions 215 and 217 extending toward each other and a transparent cover 219 is positioned in the recess thus constituted. A pin 221 is fixedly supported at the front end of handle 151 and is adapted to have interfitting engagement with the dial plate 213 as well as with the cover 219 which is of flexible transparent material.

We provide a pair of terminals 223 and 225 (Figs. 1 and 3) which are secured to the rear handle support 153 in a recess 227 therein, this recess being of substantially L-shape. Plate 119 is secured to one of these terminals while a terminal lead 229 of the heating element 37 is secured to the other terminal. A twin conductor supply circuit cord 231 is adapted to extend into the opening 227 initially from the right-hand side thereof as seen from the rear of the iron. We provide also an anti-kinking support 233 for the cord 231, all in a manner now well known in the art.

As we desire that the iron be usable by a left-handed user, we provide an opening on the left-hand side of the handle portion 153 and normally locate therein a plug 235. In case a user desires to use the iron holding it with his left hand, all that is necessary to adapt it for such use is to remove the cord 231 and the plug 235 and interchange them so that the cord is at the left-hand side of the iron, as seen from the rear, and the plug is at the right-hand side of the iron. In conformity therewith we provide a pair of thumb rests 237 and 239 at the front end of the handle portion. The right-handed user will use thumb rest 237, while the left-handed user will use thumb rest 239.

Referring now to Fig. 23, we have there shown a modification of the manually-actuable switch-adjusting means which we may use instead of that shown in Fig. 15. This adjusting means comprises a control shaft 241 in an opening 243 in member 171, the lower end of which shaft extends through the casing and member 143 and engages the spring arm 115. The upper end of shaft 241 is rigidly connected with a cup-shaped member 245 the upper surface of the wall extending at an angle and having a projection 247 adapted to move in a longitudinal slot 249 and prevent turning movement of member 245. A control wheel hub 251 has its lower end interfitting with an opening in the lower end portion of member 245. A cam member 253 having a lower angularly-extending surface thereon engaged by the angularly-extending surface of the upper end of member 245 is screwed on member 251 against a control wheel 197, which latter abuts an externally fluted head 255 on member 251. A control wheel stop 199 has an opening extending into it from its lower surface, the inner surface of the opening being fluted to engage head 255 in selected position determined by a pointer or arrow mark on member 199, and being held in such position by a screw 203. A spring 257 biases member 245 and 241 so that the two cam surfaces will always be in engagement with each other.

The thin sole plate and thin top plate of metal of high thermal conductivity constitute an iron body of low mass adapted to rapid heating by the heating element. By reason of the pressure and brazing operations they are in efficient heat exchange relation with the heating element and with each other. Being bonded together around their margins the thin plates reinforce each other and constitute, in effect an integral thin, non-warping, iron body with an embedded heating element. The assembly plugs with their rigid connections with both plates further reinforce the plates and together with the contacting marginal areas of the plate provide heat exchange paths for the transfer of heat from the top plate to the sole plate when a temperature differential therebetween develops due to rapid absorption of heat from the ironing surface of the sole plate by damp material under ironing.

The thermally responsive actuating element of the control switch for the heating element is arranged to follow without lag temperature changes of the ironing surface. Being embedded in the sole plate it is close to such surface. Further, the thin and high thermal conductive sole plate is adapted to rapidly respond as a whole to temperature changes of the sole plate and to render the thermal element quickly responsive to such temperature changes. Because the thermal element is in direct contact with the sole plate near the ironing surface and is in a sealed closed chamber, it is highly sensitive to the temperature of the sole plate. The location of portions of the heating element over the thermal element for heating the same compensates for the fact that while heating of the sole plate ironing surface is through thin metal, the thermal element, for operating movement, can have only limited heat exchange contact with the sole plate and is surrounded by air.

Various modifications may be made in our invention without departing from the spirit or scope thereof and all such modifications coming clearly within the scope of the appended claims are to be considered as part of our invention.

We claim as our invention:

1. An electric iron, comprising a relatively thin metal sole plate, a thin metal top plate thereabove having a recess in its bottom surface to provide a peripheral shoulder therearound, a flat insulated electric heating element in said recess, having a thickness on the order of the depth of said recess, a cord of asbestos around the outer periphery of said heating element having an initial thickness greater than the depth of said recess and brazing material between the shoulder on said top plate and said sole plate holding said plates in tight operative engagement.

2. An electric iron comprising a relatively thin brass sole plate, a thin brass top plate thereabove having a recess in its lower surface to provide a relatively thin peripheral shoulder therearound, a flat insulated electric heating element in said recess, having a thickness on the order of the depth of said recess, a cord of asbestos located around the outer periphery of said heating element having an initial thickness greater than the depth of said recess, brazing material between the shoulder on said top plate and said sole plate holding said plates in tight operative engagement, an assembly plug secured to said sole plate and projecting upwardly through said top plate, a recess of arcuate shape in the upper surface of said sole plate, a bimetal strip in said arcuate shaped recess and a control switch for said heating element supported on said assembly plug and adapted to be actuated by said bimetal strip.

3. The method of securing together the parts of a heated body portion of an electric sadiron which comprises the steps of positioning a top plate having a planar electric heater in a recess in its underside upon a sole plate with brazing material between the recess wall in the top plate and the sole plate, positioning the assembled parts relative to a heating means, raising the temperature of said parts to a value at which the material of the top and sole plate begins to soften and said brazing material melts, applying a clamping pressure to the assembly sufficient to cause the top plate to start to flatten to compress the heating element tightly, cooling it under pressure to a temperature on the order of 600° F. to 800° F., then removing the clamping pressure and cooling the assembly to ordinary room temperature and machining the peripheral surface.

4. The method of assembling a heated body portion for an electric sadiron, which comprises the steps of positioning a top plate having a planar electric heater in a recess in its underside upon a sole plate having a pair of assembly plugs positioned in recesses in the top surface of the sole plate and extending through openings in the top plate, with brazing material in said recesses in the sole plate and around the peripheral portion of said top and sole plate, locating said assembled parts in proper operative positions relatively to each other relatively to a heating means, raising the temperature of the assembled parts to a value at which the material of the top plate and the sole plate begins to soften, applying a clamping pressure to the assembly sufficient to cause the top plate to tightly compress the heating element, cooling it under pressure to a temperature on the order of 600° F. to 800° F., removing the clamping pressure, cooling the assembly to ordinary room temperature, swaging the assembly plugs against the top plate, machining the peripheral surface and then plating the lower surface of said sole plate and the peripheral surface of the assembled parts.

5. An electric sadiron comprising a relatively thin metal sole plate, a relatively thin metal top plate thereabove having a recess in its lower surface to provide a relatively thin peripheral shoulder therearound, a planar insulated electric heating element in said recess having a thickness on the order of the depth of said recess, brazing material between said peripheral shoulder of the top plate and said sole plate holding the shoulder of said top plate tightly against said sole plate and compressing tightly the outer portion of said heating element and a pair of assembly plugs positioned on a longitudinal center line of the iron having their lower ends secured to said sole plate and extending through openings in said top plate and having an intermediate portion thereof swaged against the top plate to tightly clamp the intermediate portion of the heating element between the top plate and sole plate.

6. The method of forming an electric iron body from a metal sole plate, a metal pressure plate and a flat electric heating element, said plates having flat parallel margins around their peripheries and one of said plates having a shallow flat recess bounded by the plate margin adapted to accommodate the heating element, which comprises bringing the flat margins of the plates into opposing relation with brazing material being applied between the margins and with the heating element in said recess, heating the plates above the melting temperature of the brazing material so as to cause the brazing material to melt, applying clamping pressure to the plates during heating to compress the brazing material and cause the plates to tightly clamp the heating element, then cooling the plates while still under clamping pressure until the brazing material hardens and bonds the margins together.

7. The method of forming an electric iron body from a metal sole plate, a metal pressure plate and a flat electric heating element, said plates having flat parallel margins around their peripheries and one of said plates having a shallow flat recess bounded by the plate margin adapted to accommodate the heating element, which comprises bringing the flat margins of the plates into opposing relation with brazing material being applied between the margins and with the heating element in said recess, heating the plates above the melting temperature of the brazing material so as to cause the brazing material to melt, applying to the plates during heating clamping and forming pressure sufficiently high as to conform the plates to, and cause them to tightly clamp, the heating element, and to conform the margins of the plate to each other in closely spaced parallel relation with a thin layer of brazing material compressed between them, then cooling the plates while still under clamping pressure until the brazing material hardens and bonds the margins together.

8. The method of forming an electric iron body from a brass sole plate, a brass pressure plate and a flat electric heating element, said plates having flat parallel margins around their peripheries and one of said plates having a shallow flat recess bounded by the plate margin adapted to accommodate the heating element, which comprises bringing the flat margins of the plates into opposing relation with brazing material being applied between the margins and with the heating element in said recess, heating the plates above the melting temperature of the brazing material so as to cause the brazing material to melt, applying to the plates during heating clamping and forming pressure sufficiently high as to conform the plates to, and cause them to tightly clamp, the heating element, and to conform the margins of the plate to each other in closely spaced parallel relation with a thin layer of brazing material compressed between them, then cooling the plates while still under clamping pressure until the brazing material hardens and bonds the margins together.

9. The method of forming an electric iron body from a metal sole plate, a metal pressure plate having a plurality of openings in the central area thereof, a plurality of metal plugs adapted to fit said openings in the pressure plate and a flat electric heating element, said plates having flat parallel margins around their peripheries and one of said plates having a shallow flat recess bounded by the plate margin adapted to accommodate the heating element, which comprises bringing the flat margins of the plates into opposing relation with brazing material being applied between the margins and with the heating element in said recess and the metal plugs mounted on the sole plate and projecting upwardly through the openings in the pressure plate, heating the plates above the melting temperature of the brazing material so as to cause the brazing material to melt, applying to the plates during heating clamping and forming pressure sufficiently high as to conform the plates to, and cause them to tightly clamp, the heating element, and to conform the margins of the plate to each other in closely spaced parallel relation with a thin layer of brazing material compressed between them, then cooling the plates while still under clamping pressure until the brazing material hardens and bonds the margins together and then securing the plugs to the pressure plate.

10. The method of forming an electric iron body from a bimetal thermostat, a metal sole plate having an upwardly facing recess adapted to accommodate the bimetal thermostat, a metal pressure plate and a flat electric heating element, said plates having flat parallel margins around their peripheries and one of said plates having a shallow flat recess adapted to accommodate the heating element, which comprises installing the bimetal thermostat in its accommodating recess in the sole plate, bringing the flat margins of the plates into opposing relation with brazing material being applied between the margins and with the heating element in said recess and overlying the bimetal thermostat, heating the plates above the melting temperature of the brazing material so as to cause the brazing material to melt, applying to the plates during heating clamping and forming pressure sufficiently high as to conform the plates to, and cause them to tightly clamp, the heating element, and to conform the margins of the plate to each other in closely spaced parallel relation with a thin layer of brazing material compressed between them, then cooling the plates while still under clamping pressure until the brazing material hardens and bonds the margins together.

11. As a new article of manufacture, an electric iron body made in accordance with the method of claim 6.

12. As a new article of manufacture, an electric iron body made in accordance with the method of claim 7.

13. As a new article of manufacture, an electric iron body made in accordance with the method of claim 8.

14. As a new article of manufacture, an electric iron body made in accordance with the method of claim 9.

15. As a new article of manufacture, an electric iron body made in accordance with the method of claim 10.

JOHN R. GOMERSALL.
MURRAY IRELAND.

REFERENCES CITED

The following references are of record in the file of this patent:

UNITED STATES PATENTS

| Number | Name | Date |
|---|---|---|
| 1,551,868 | Clark et al. | Sept. 1, 1925 |
| 1,571,922 | Vaughan | Feb. 2, 1926 |
| 1,665,219 | Rankin | Apr. 10, 1928 |
| 1,764,301 | Harpster | June 17, 1930 |
| 1,812,122 | Spencer | June 30, 1931 |
| 2,101,095 | Price | Dec. 7, 1937 |
| 2,101,098 | Russell | Dec. 7, 1937 |
| 2,122,604 | Bridges | July 5, 1938 |
| 2,200,557 | Kuhn et al. | May 14, 1940 |
| 2,277,439 | Jepson | Mar. 24, 1942 |
| 2,299,462 | Clark et al. | Oct. 20, 1942 |
| 2,320,013 | Scharf | May 25, 1943 |
| 2,343,158 | Scott | Feb. 29, 1944 |
| 2,427,379 | Ashbaugh | Sept. 16, 1947 |

FOREIGN PATENTS

| Number | Country | Date |
|---|---|---|
| 23,260 | Great Britain | of 1896 |